United States Patent
Kaplun

(12)
(10) Patent No.: US 6,467,374 B1
(45) Date of Patent: Oct. 22, 2002

(54) CONTINUOUSLY VARIABLE MECHANICAL TRANSMISSION

(76) Inventor: Gregory Kaplun, 2448 Pennsylvania St., Allentown, PA (US) 18104

( * ) Notice: Subject to any disclaimer, the term of this patent is extended or adjusted under 35 U.S.C. 154(b) by 114 days.

(21) Appl. No.: 09/624,408

(22) Filed: Jul. 24, 2000

(51) Int. Cl.[7] ............................. F16H 15/28; F16H 3/42
(52) U.S. Cl. .......................... 74/640; 74/393; 74/416; 476/55
(58) Field of Search .................... 74/640, 393, 396, 74/416; 476/18, 26, 47, 55

(56) References Cited

U.S. PATENT DOCUMENTS

| | | | | |
|---|---|---|---|---|
| 2,056,101 A | * | 9/1936 | Hall | 476/55 |
| 2,626,002 A | * | 1/1953 | Wubbe | 476/55 |
| 2,737,820 A | * | 3/1956 | Collar | 476/55 |
| 3,333,479 A | * | 8/1967 | Shields | 476/55 |
| 4,210,032 A | * | 7/1980 | Lampert | 476/55 |
| 5,062,626 A | * | 11/1991 | Dalebout et al. | 482/1 |

* cited by examiner

*Primary Examiner*—Sherry Estremsky
(74) *Attorney, Agent, or Firm*—Cheryl R. Figlin

(57) ABSTRACT

A continuously variable mechanical transmission comprised of two wheels, either friction or toothed, of which one or both are in the shape of hemispheres. A hemisphere wheel is mounted through a bearing on a fork with two pivots attached to the inner race of the bearing, allowing the wheel to rotate around two perpendicular accesses. The center of the wheel is attached to the shaft through a double universal joint or a flexible shaft. The other wheel can be a regular narrow wheel fixed to the second shaft. By rotating the hemisphere wheel around the fork pivots the diameter of the wheel engaged with the second wheel is increased or decreased allowing the transmission rate to vary.

21 Claims, 4 Drawing Sheets

CONTINUOUSLY VARIABLE MECHANICAL TRANSMISSION

BACKGROUND OF THE INVENTION (1) Field of the Invention

The invention relates to a mechanical transmission, and more particularly a mechanical transmission that is truly continuously variable.

(2) Description of the Prior Art

The most common mechanical transmission in use today is the sliding gear transmission. It is a very efficient mechanism, but is incapable of automatically changing the speed ratio without manually changing gears. Most power sources can operate only over small speed range with good economy and power. As a result, a large number of gear changes are required for efficient operation.

The present automatic and manual transmissions in use attempt to maximize operating economy and power through a constant maintenance of power source rotational speed at the top of the power curve. These transmissions do not have high efficiency or smooth operation because they must have stepped speed ratio changes. Various types of transmissions utilize braking or slipping actions to accommodate speed rate change. These transmissions generate high internal power losses.

Existing designs for continuously variable transmission such as "V" belt transmissions, Hydraulic transmissions and mechanical planetary gear and variable length lever transmissions lack efficiency, simplicity of operation, power transmission capability or operating speed range.

SUMMARY OF THE INVENTION

The object of the present invention is to have a continuously variable mechanical transmission system. The step less ratio change takes advantage of the fact that a hemisphere rotating around its polar axis has larger length of circumference at its major diameter than close to its tip, because the radius of a hemisphere is a constant the transition from the major diameter to a minor produces step less length of circumference change without changing the point of engagement between the hemisphere wheel and a second wheel. The present invention can be adapted to any mechanical variable output device. The hemisphere wheel thus would be mounted on the bearing. The inside race of the bearing would have two pivot points inside the wheels major diameter, allowing the wheel to swing around the mounting fork, the fork is attached to the wall of the transmission. The center of the hemisphere wheel would be connected to the driving shaft through a constant velocity device (double universal joint, flexible shaft or similar). Alternatively, a motor can be mounted on the inner race of the bearing with its shaft attached to the hemisphere wheel thus eliminating the need for a constant velocity device.

A control lever would have a joint attachment to the inner race of the wheel bearing, perpendicular to the pivot points. Movement of the control lever would swing the hemisphere wheel around the pivot points, therefore changing the engaged diameter of the wheel. The position of the control lever would determine the transmission rate. If a double universal joint is used to connect the driving shaft to the hemisphere wheel, the maximum swing angle of the wheel can be 70 degrees. At this angle of the wheel, the transmission rate will be 2.8 times less then when the angle is equal to zero and the hemisphere wheel is engaged at its major diameter. The second wheel of the transmission can be a regular narrow wheel or another hemisphere wheel similarly mounted and attached to the second shaft.

It is therefore an object of the present invention to provide an improved continuously variable mechanical transmission system which can be easily and economically produced, simple in principal, convenient in operation, sturdy in construction, highly efficient, long lasting and capable of operating under wide range of power and speed. It is another object of the invention to have a transmission with ratio of input to output that can be varied instead of fixed.

It is a further object of the present invention to have a continuously variable transmission system comprising: an input shaft is a flexible constant velocity device connected to a hemisphere wheel on the inside center of said hemisphere wheel. The hemisphere wheel having a bearing. A housing of the transmission having a mounting fork attached to the hemisphere wheel at two pivot points on the inner race of the bearing located on the inside circumference at the hemispheres major diameter. Further having a control lever with a joint attachment to the inner race of the bearing that is perpendicular to the pivot points of the mounting fork; and having an output shaft connected to a second wheel, and the second wheel's circumference engaged with the outside of said hemisphere wheel. Finally, the control lever having the ability to swing the hemisphere wheel around the pivot points of the mounting fork to change the engaged diameter of the hemisphere wheel such that the difference in diameter from equator to pole creates a continuously variable transmission.

BRIEF DESCRIPTION OF THE DRAWINGS

In the accompanying drawings forming a material part of there is shown.

DETAILED DESCRIPTION OF THE PREFERRED EMBODIMENTS

Figure 1:
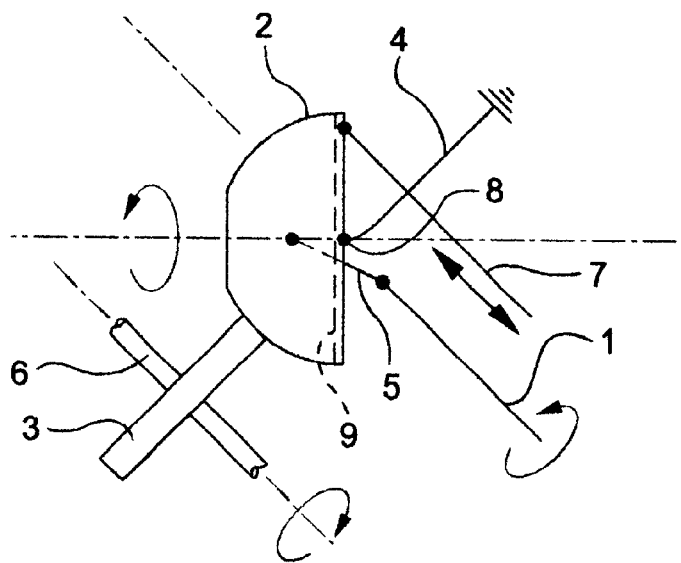
FIG. 1 shows a top view of the first embodiment of the continuously variable mechanical transmission consisting of the one hemisphere and one regular wheel.
Figure 2:
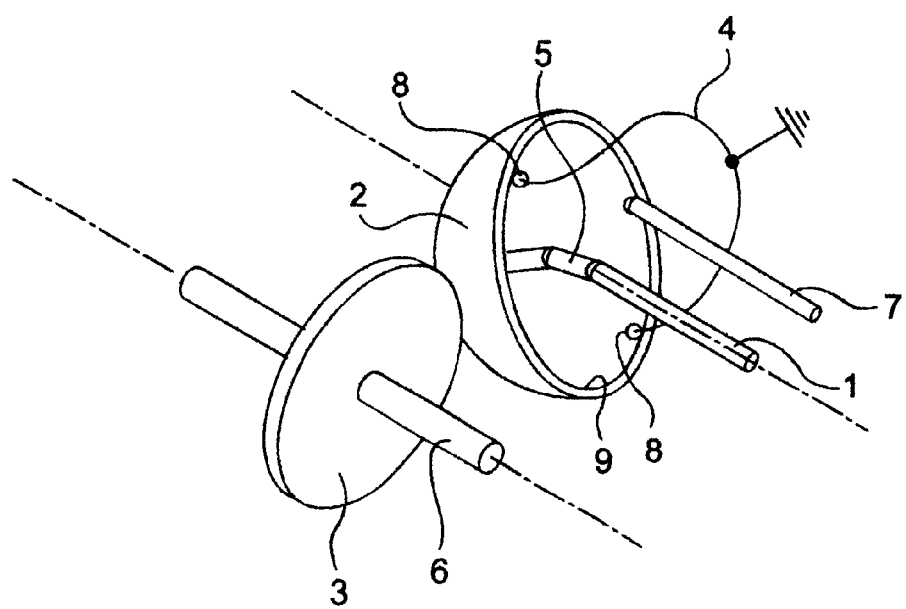
FIG. 2 shows perspective view of the first embodiment of the present invention.

Referring to the FIG. 1, there is shown a first embodiment of the continuously variable mechanical transmission where input shaft 1 is connected to the hemisphere wheel 2 through a double universal joint 5, flexible shaft or a similar constant velocity device. The hemisphere wheel is rotating on the bearing 9, the inner race of the bearing having two pivot points 8, attached to the mounting fork 4. The fork is fixed to the housing of the transmission (not shown). The fork 4 can be attached directly to the hemisphere wheel or, as well known in the art can have an intermediate member connecting the fork to the hemisphere wheel. The bearing 9 is located at the major diameter of the hemisphere wheel. However, as is well known in the art, the bearing can be in a number of places on the hemisphere wheel and is only a matter of design. The control lever 7 determines the angle between the hemisphere wheel and the input shaft. The control lever 7 is connected to the inner race of the bearing 9 through a pivot joint. The hemisphere wheel is engaged through friction with the second wheel 3, mounted on the output shaft 6. As input shaft 1 is being driven by an outside source of power such as an engine or a motor, it is rotating the hemisphere wheel 2 with the same speed as the shaft through a constant velocity device 5. The speed of the wheel is the same as the input shaft regardless of the angle between the wheel and the shaft. An unspecified positioning device operates the control lever 7, such as, for example, a computer controlled hydraulic cylinder, or a computer controlled pneumatic cylinder, or an actuator. The control lever can, also, be controlled manually. The position of the control lever 7 is determining the angle between the wheel 2 and the shaft 1. When this angle is equal zero (the hemisphere wheel 2 and the shaft 1 are rotating on the same axis), the hemisphere wheel is engaged with the second wheel 3 at the hemisphere wheels major diameter. The output speed in this position is the highest allowed by the wheels diameter ratio. When the control lever 7 turns the hemisphere wheel around pivot points 8 to a maximum angle allowed by the constant velocity device 5, the hemisphere wheel is engaged with the second wheel 3 at the hemisphere wheels minor diameter. The output speed in this position is the lowest allowed by the wheel diameter ratio. If a double universal joint is used to connect the driving shaft to the hemisphere wheel, the maximum swing angle of the wheel can be 70 degrees. At this angle of the wheel, the transmission rate will be 2.8 times less then when the angle is equal to zero and the hemisphere wheel is engaged at its major diameter. Due to the fact that the pivot points 8 lay on the diameter of the hemisphere wheel, the engagement point between the wheels being at the radius distance from the pivot points does not change regardless of the angle between the hemisphere wheel and the input shaft. The step less transmission rate change is accomplished by turning the hemisphere wheel around the hemisphere wheel's pivot points.

Figure 7:
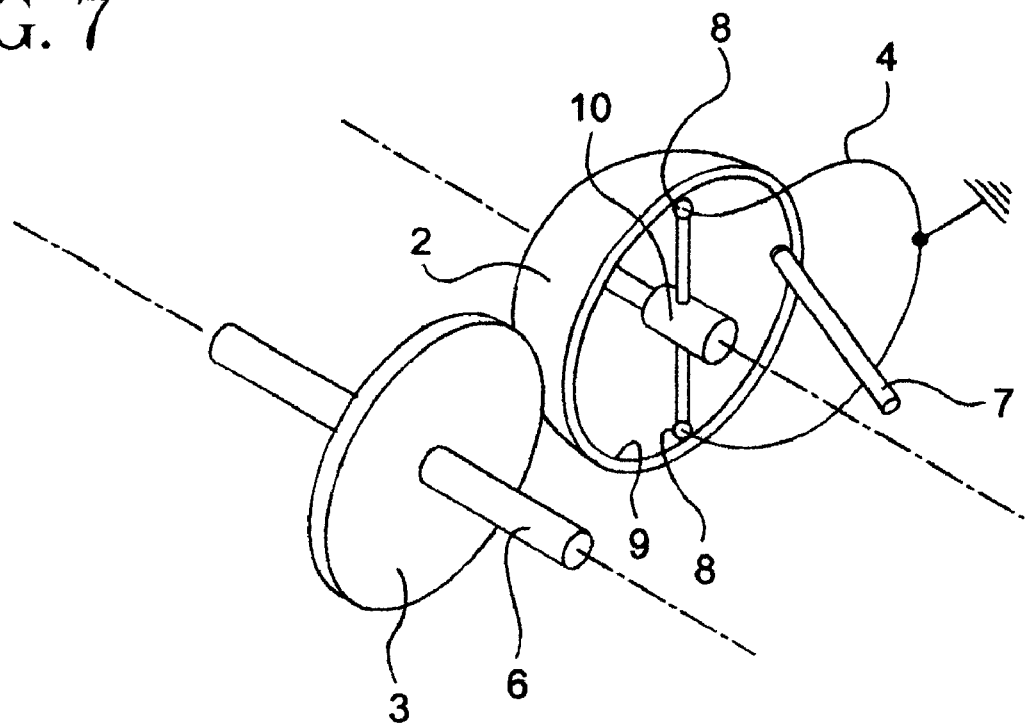
FIG. 7 shows a perspective view of a fifth embodiment of the present invention.

In another embodiment of the present invention a motor can be mounted on the inner race of the bearing with it's shaft attached to the hemisphere wheel thus eliminating the need for a constant velocity device. This can be shown in FIG. 7.

Figure 3:
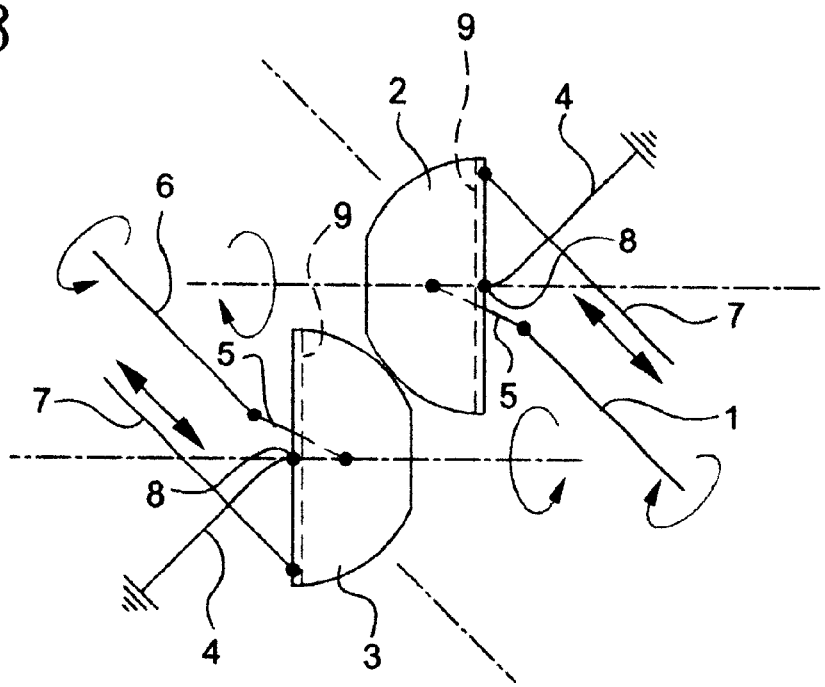
FIG. 3 shows a top view of the second embodiment of the continuously variable mechanical transmission consisting of the two hemisphere wheels.

Referring to the FIG. 3, this embodiment of the transmission is showing two hemisphere wheels engaged through friction. Two control levers 7 determine the position of each hemisphere wheel separately. The speed of the output shaft 6 is the highest when the major diameter of wheel 2 is engaged with the minor diameter of wheel 3. It is the lowest, when minor diameter of wheel 2 is engaged with major diameter of wheel 3.

Figure 4:
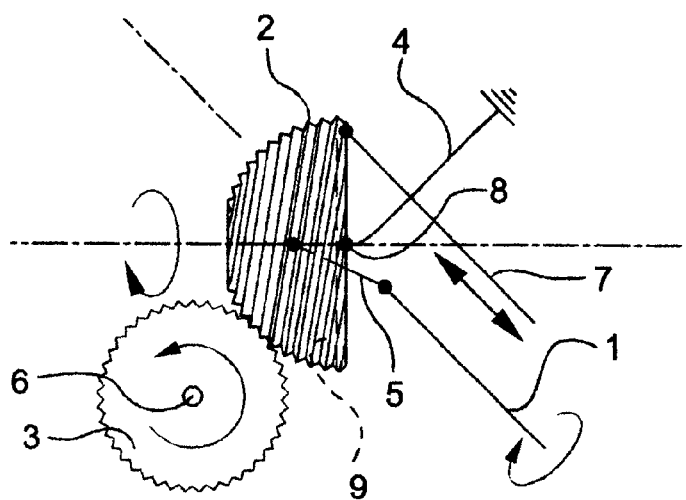
FIG. 4 shows a top view of the third embodiment of the continuously variable mechanical transmission consisting of the one hemisphere worm wheel and one regular toothed wheel.

Referring to the FIG. 4, this embodiment of the transmission is showing a hemisphere worm wheel 2 engaged with a regular toothed wheel 3. A worm (spiral tooth) is cut into a hemisphere wheel with the tooth profile being kept perpendicular to the hemisphere surface. The input shaft 1 and the output shaft 6 are perpendicular to each other allowing the worm to slide across the profile of the teeth of the second wheel 3. Operation of the transmission is otherwise the same as in the first embodiment.

Figure 5:
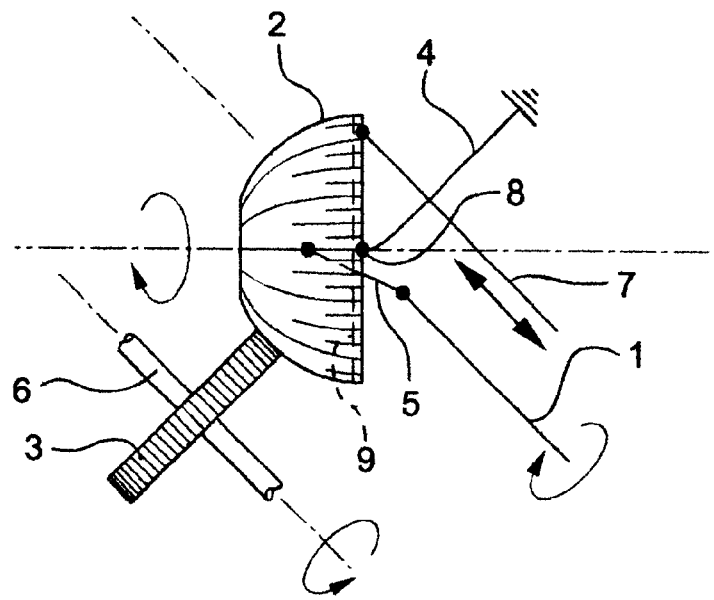
FIG. 5 shows a top view of the fourth embodiment of the continuously variable mechanical transmission consisting of the one hemisphere gear wheel and one regular toothed wheel.

Referring to the FIG. 5, this embodiment of the transmission is showing a hemisphere gear wheel 2 engaged with another gear 3. The teeth are cut along the axis of the hemisphere wheel. Due to the diminishing surface area towards the tip of the hemisphere, some of the tooth profiles will shrink until they will completely disappear. The tooth profiles have to be selected for multiple teeth engagement (for example: teeth with a small pitch or spiral teeth). Operation of the transmission is otherwise the same as in the first embodiment.

Figure 6:
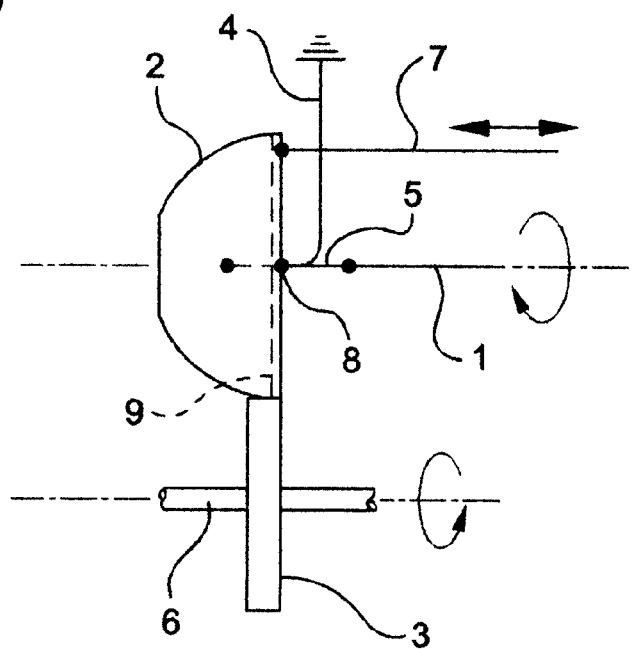
FIG. 6 shows a top view of the first embodiment of the continuously variable mechanical transmission with the hemisphere wheel rotating on the same axis with the input shaft.

Referring to FIG. 6, this is the first embodiment of the invention as described for FIG. 1, however the hemisphere wheel is rotating on the same axis as the input shaft.

While the invention has been particularly shown and described with reference to the preferred embodiments thereof, it will be understood by those skilled in the art that various changes in form, and details may be made without departing from the spirit and scope of the above described embodiments of the invention. The present invention can be adapted to any mechanical variable output device.

What is claimed is:

1. A continuously variable transmission system comprising:
   an input means for an input shaft wherein said input shaft is connected to an inside of a hemisphere wheel;
   a housing having a mounting fork and means to attach to said hemisphere wheel at two pivot points;
   a control lever means attached to said hemisphere wheel;
   an output means for an output shaft wherein said output shaft is connected to a second wheel by connection means;
   a circumference of said second wheel engaged with the outside of said hemisphere wheel; said control lever means having the ability to swing the hemisphere wheel around the pivot points of the mounting fork to change the engaged diameter of the hemisphere wheel.

2. A continuously variable transmission system comprising:
   an input means for an input shaft wherein said input shaft is a flexible constant velocity device connected to a hemisphere wheel on the inside center of said hemisphere wheel;
   said hemisphere wheel having a bearing located on the inside circumference of the hemisphere wheel;
   a housing having a mounting fork attached to said hemisphere wheel at two pivot points located at the hemispheres major diameter;
   a control lever having a joint attachment to the inner race of the bearing, perpendicular to the pivot points of the mounting fork;
   an output means for an output shaft wherein said output shaft is connected to a second wheel at the center of said second wheel;
   the circumference of said second wheel is engaged with the outside of said hemisphere wheel; said control lever having the ability to swing the hemisphere wheel around the pivot points of the mounting fork to change the engaged diameter of the hemisphere wheel.

3. The transmission of claim 2, wherein the bearing is located on the inside circumference of the hemisphere wheel at the hemispheres major diameter and the two pivot points are located on an inner race of said bearing.

4. The transmission of claim 2, wherein the hemisphere wheel is a hemisphere worm wheel and the second wheel is a regular toothed wheel.

5. The transmission of claim 2, wherein the hemisphere wheel is engaged by friction to the second wheel.

6. The transmission of claim 2, wherein the hemisphere wheel is a hemisphere gear wheel and the second wheel is a regular toothed wheel.

7. The transmission of claim 6, wherein the hemisphere gear wheel consists of teeth in the shape of a gear around an outer circumference of the hemisphere wheel, such that some of the teeth disappear at a minor diameter of the hemisphere wheel.

8. The transmission of claim 2, wherein a ratio of input to output is not fixed.

9. The transmission of claim 2, wherein the output means are attached to the input means of a conventional transmission.

10. The transmission of claim 2, wherein the output means are attached to input means of a second transmission comprising:

- the input means having an input shaft wherein said input shaft is a flexible and movable shaft connected to a hemisphere wheel on the inside center of said hemisphere wheel;
- said hemisphere wheel having a bearing located on the inside circumference of the hemisphere wheel;
- a housing having mounting fork attached to said hemisphere wheel at two pivot points located at the hemispheres major diameter;
- a control lever having a joint attachment to the inner race of the bearing, perpendicular to the pivot points of the mounting fork;
- an output means for an output shaft wherein said output shaft is connected to a second wheel at the center of said second wheel;
- the circumference of said second wheel is engaged with the outside of said hemisphere wheel;
- said control lever having the ability to swing the hemisphere wheel around the pivot points of the mounting fork to change the engaged diameter of the hemisphere wheel.

11. The transmission of claim 2, wherein the output means are attached to input means of a second transmission comprising:

- the input means for an input shaft wherein said input shaft is a first flexible and movably connected to a first hemisphere wheel on the inside center of said first hemisphere wheel;
- said first hemisphere wheel having a first bearing located on the inside circumference of the first hemisphere wheel;
- a housing having a first mounting fork attached to said first hemisphere wheel at two pivot points located at the first hemispheres major diameter;
- a first control lever having a joint attachment to an inner race of the first bearing, perpendicular to the pivot points of the first mounting fork;
- an output means for an output shaft wherein said output shaft is connected to a second hemisphere wheel with a second flexible and movable connection on the inside center of said second hemisphere wheel;
- said second hemisphere wheel having a second bearing located on the inside circumference of the second hemisphere wheel;
- the housing having a second mounting fork attached to said second hemisphere wheel at two pivot points located at the second hemispheres major diameter;
- a second control lever having a joint attachment to the second inner race of the second bearing, perpendicular to the pivot points of the second mounting fork;
- an outer circumference of said second hemisphere wheel engaged with an outer circumference of said first hemisphere wheel;
- said control levers having the ability to swing both hemisphere wheels around the pivot points of the mounting forks to change the engaged diameters of both of the hemisphere wheel.

12. The transmission of claim 2, wherein the flexible constant velocity device is a double universal joint.

13. The transmission of claim 2, wherein the flexible constant velocity device is a flexible shaft.

14. The transmission of claim 2, wherein the input means is an engine or a motor.

15. The transmission of claim 2, wherein the control lever is controlled by one of the following:

a. an hydraulic cylinder, or b. a pneumatic cylinder, or c. an actuator, or d. manually.

16. A continuously variable transmission system comprising:

- an input means for an input shaft wherein said input shaft is a flexible constant velocity device connected to a first hemisphere wheel on the inside center of said first hemisphere wheel;
- said first hemisphere wheel having a first bearing located on the inside circumference of the first hemisphere wheel;
- a housing having a first mounting fork attached to said first hemisphere wheel at two pivot points located at the first hemispheres major diameter;
- a first control lever having a joint attachment to an inner race of the first bearing, perpendicular to the pivot points of the first mounting fork;
- an output means for an output shaft wherein said output shaft is connected to a second hemisphere wheel with a flexible and movable connection on the inside center of said second hemisphere wheel;
- said second hemisphere wheel having a second bearing located on the inside circumference of the second hemisphere wheel;
- the housing having a second mounting fork attached to said second hemisphere wheel at two pivot points located at the second hemispheres major diameter;
- a second control lever having a joint attachment to the second inner race of the second
- bearing, perpendicular to the pivot points of the second mounting fork;
- an outer circumference of said second hemisphere wheel engaged with an outer circumference of said first hemisphere wheel;
- said control levers having the ability to swing both hemisphere wheels around the pivot points of the mounting forks to change the engaged diameters of both of the hemisphere wheels.

17. The transmission of claim 16 wherein the first and second bearings are located on the inside circumference of both first and second hemisphere wheels at the hemispheres major diameters and the first and second two pivot points are located on an inner race of the first and second bearings respectively.

18. The transmission of claim 16 wherein the output means are attached to input means of a second transmission comprising:

the input means having an input shaft wherein said input shaft is a flexible and movable shaft connected to a hemisphere wheel on the inside center of said hemisphere wheel;

said hemisphere wheel having a bearing located on the inside circumference of the hemisphere wheel;

a housing having a mounting fork attached to said hemisphere wheel at two pivot points located at the hemispheres major diameter;

a control lever having a joint attachment to the inner race of the bearing, perpendicular to the pivot points of the mounting fork;

an output means for an output shaft wherein said output shaft is connected to a second wheel at the center of said second wheel;

the circumference of said second wheel is engaged with the outside of said hemisphere wheel;

said control lever having the ability to swing the hemisphere wheel around the pivot points of the mounting fork to change the engaged diameter of the hemisphere wheel.

19. The transmission of claim 16, wherein the output means are attached to input means of a second transmission comprising:

the input means for an input shaft wherein said input shaft is a first flexible and movably connected to a first hemisphere wheel on the inside center of said first hemisphere wheel;

said first hemisphere wheel having a first bearing located on the inside circumference of the first hemisphere wheel;

a housing having a first mounting fork attached to said first hemisphere wheel at two pivot points located at the first hemispheres major diameter;

a first control lever having a joint attachment to an inner race of the first bearing, perpendicular to the pivot points of the first mounting fork;

an output means for an output shaft wherein said output shaft is connected to a second hemisphere wheel with a second flexible and movable connection on the inside center of said second hemisphere wheel;

said second hemisphere wheel having a second bearing located on the inside circumference of the second hemisphere wheel;

the housing having a second mounting fork attached to said second hemisphere wheel at two pivot points located at the second hemispheres major diameter;

a second control lever having a joint attachment to the second inner race of the second bearing, perpendicular to the pivot points of the second mounting fork;

an outer circumference of said second hemisphere wheel engaged with an outer circumference of said first hemisphere wheel;

said control levers having the ability to swing both hemisphere wheels around the pivot points of the mounting forks to change the engaged diameters of both of the hemisphere wheel.

20. A continuously variable transmission system comprising:

a hemisphere wheel having a bearing located on the inside circumference of the hemisphere wheel;

a housing having a mounting fork attached to said hemisphere wheel at two pivot points located at the hemispheres major diameter;

an input means wherein said input means is a motor mounted on the inner race of the bearing; a control lever having a joint attachment to the inner race of the bearing, perpendicular to the pivot points of the mounting fork;

an output means for an output shaft wherein said output shaft is connected to a second wheel at the center of said second wheel;

said control lever having the ability to swing the hemisphere wheel around the pivot points of the mounting fork to change the engaged diameter of the hemisphere wheel.

21. The transmission of claim 20, wherein the bearing is located on the inside circumference of the hemisphere wheel at the hemispheres major diameter and the two pivot points are located on an inner race of said bearing.

* * * * *